April 27, 1948.  A. M. R. KARLSTROM  2,440,514
PROCESS FOR THE PURIFICATION OF RAW WATER FROM COLLOIDAL HUMIC SUBSTANCES
Filed Nov. 16, 1944
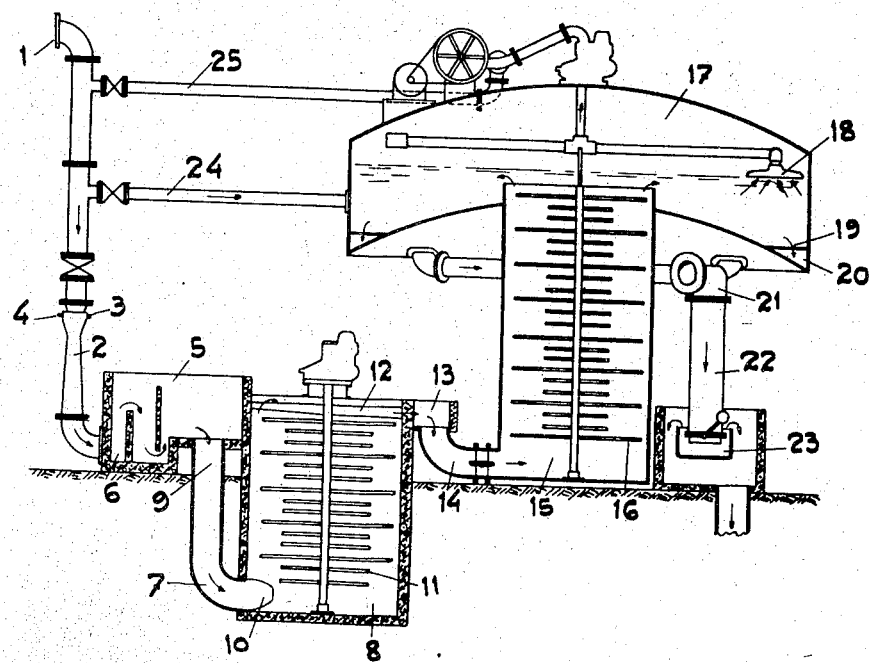
INVENTOR.
Adolf M. R. Karlstrom
BY
William C Linton
ATTORNEY.

Patented Apr. 27, 1948

2,440,514

UNITED STATES PATENT OFFICE 2,440,514

PROCESS FOR THE PURIFICATION OF RAW WATER FROM COLLOIDAL HUMIC SUBSTANCES

Adolf Magnus Rupert Karlstrom, Goteborg, Sweden

Application November 16, 1944, Serial No. 563,711
In Sweden November 23, 1943

2 Claims. (Cl. 210—16)

The present invention relates to processes for the purification of raw water. For the purification of such water it is customary to add suitable quantities of alum and alkali to the raw water whereby the humic substances will be coagulated. The addition of said chemicals takes place continuously and, as a rule, while subjecting the water to a slow agitation. The water then flows through large basins where most part of the flocs, which incessently increase in size, deposits. The water with small humic flocs flowing through the sedimentation basins is passed to sand filters where the remaining humic flocs are to be retained. The drawbacks of such a purification plant are great capital and working costs, large space required and discontinuity in its operation.

According to the present invention the humic substances are separated from the raw water by flotation, since the humic substances have been flocculated by the addition of a water soluble salt with a trivalent positive ion such as aluminium, iron and chromium, and air has been introduced into the water whereby the latter obtains the quantity of air required for the flotation as well as is thoroughly agitated which promotes the flocculation of the colloidal humic substances. For it is a known fact that a thorough agitation of the water promotes the flocculation of colloidal substances. By the aeration of the water and the escape of the air superfluous for the flotation proper before the entrance of the water into the flotation tank each portion of the water mass will be subjected to an efficient agitation. The flotation may be carried out under outer atmospheric pressure or under reduced pressure. In both cases the water flows in an upwardly directed current and consequently through a preferably vertical conduit into the flotation tank. In this upward flow the water is subjected to an agitation by an agitator. If the raw water has obtained the suitable preparatory treatment the humic substances flocculated may be separated by flotation in a very satisfactory manner. In opposition to sedimentation and filtration this flotation offers the advantage of a complete continuity in its manner of operation and it may be carried out by an apparatus requiring small space and to relatively low costs.

After the aeration of the raw water and the flocculation of the humic substances by the addition of a water soluble salt with a trivalent positive ion, small quantities of a colloid with negative charge, such as animal glue or other albumin, resin glue completely saponified, soap solution, sulphonated aliphatic and resin acids may be added. Negatively charged colloids are added when an improved binding of air to the humic flocs is desired.

The accompanying drawing illustrates an embodiment of an apparatus by which the invention is carried into effect.

The water to be purified enters under pressure through the conduit 1 and passes an ejector 2, whereby air is sucked into the water through the inlet pipe 3. At the same time as the aeration of the raw water, alum solution or a solution of another salt with trivalent positive ion is supplied through the inlet pipe 4 to the nozzle of the ejector whereby the first admixture of the alum solution is attained. The water aerated and mixed with alum enters into the open box or vessel 5 where a great part of the superfluous air disturbing for the subsequent treatment escapes. From the box 5 the water passes through the conduit 7 to a flocculation tank 8 into which the conduit 7 enters tangentially. If alkali be used in connection with the flocculation it is added at 6. If desired, alum and alkali may be added at 9 and 10 respectively. In the tank 8 the water is subjected to a slow agitation by means of the agitator 11 whereby the humic substances are separated as flocs. The water intermingled with flocs escapes through flutes 12 disposed under the water level in the tank 8 to the catch chamber 13 and from the latter through the conduit 14 to the ascending tube 15 of the flotation tank. Also into the ascending tube the water enters tangentially.

Above all in the box 5 but also in the tank 8 air bubbles detrimental to the flotation will escape, and these air bubbles produce movements of the water so that an intimate mixture of the water and alum solution takes place.

In the use of a negatively charged colloid the addition thereof takes place in the flow of water between 13 and 14. The purpose of this addition is to bind the small humic flocs together, to stabilize the flocs and to make the same more suitable for the retaining of the air bubbles.

In the ascending tube 15 the water is subjected to a further slow agitation by means of the agitator 16 whereby the size of the flocs will be increased still more. In the flow of the water up to the flotation tank 17, in which a reduced pressure corresponding to a water column of about 2.5 to 3 meters is maintained, the air dissolved in the water is separated in the form of small air bubbles on the humic flocs whereby these flocs are raised to the water level in the tank. By means of scrapers and a rotary suction nozzle 18 the flocs raised to the level are removed from the tank while purified water free from flocs escapes through a plurality of discharge openings 19 to an annular channel 20 at the bottom of the tank 17. From this channel the water is discharged through a system of discharge tubes 21 which are connected to a discharge tube 22 extending down into a vessel 23 serving as water trap. This vessel 23 is adapted to be elevated or lowered. 24 indicates a conduit for the filling of the flotation tank 17 in connection with the starting of the apparatus, and 25 a water conduit used in connection with cleansing of the tank 17 and the nozzle 18.

What I claim is:

1. A process for the purification of raw water from colloidal humic substances, comprising, in combination, introduction of air into the water, addition of water soluble salt with trivalent positive ion of one of the metals aluminium, iron and chromium, subsequent slow agitation of the water for the coagulation of the humic substances, and separation by flotation of the coagulated humic substances from the water.

2. A process for the purification of raw water from colloidal humic substances, comprising, in combination, aeration of the water, addition of water soluble salt with trivalent positive ion of one of the metals aluminium, iron and chromium, subsequent slow agitation of the water for the coagulation of the humic substances, then addition of a minor amount of a negatively charged colloid to the water, and separation by flotation of the coagulated humic substances from the water.

ADOLF MAGNUS RUPERT KARLSTROM.

REFERENCES CITED

The following references are of record in the file of this patent:

UNITED STATES PATENTS

| Number | Name | Date |
|---|---|---|
| 1,065,678 | French | June 24, 1913 |
| 1,123,011 | Ripley | Dec. 29, 1914 |
| 1,333,393 | Edser | Mar. 9, 1920 |
| 1,608,019 | Fender | Nov. 23, 1926 |
| 1,619,036 | Ravnestad | Mar. 1, 1927 |
| 1,632,419 | Simpson | June 14, 1927 |
| 1,717,906 | Alsberg | June 18, 1929 |
| 2,090,467 | Borrowman | Aug. 17, 1937 |
| 2,111,788 | Krchma | Mar. 22, 1938 |
| 2,126,164 | Anderson | Aug. 9, 1938 |
| 2,128,569 | Velz | Aug. 30, 1938 |
| 2,133,251 | McCord | Oct. 11, 1938 |
| 2,248,177 | Karlstrom | July 8, 1941 |
| 2,266,097 | Tolman | Dec. 16, 1941 |
| 2,320,512 | Daily | June 1, 1943 |
| 2,324,400 | Kelly et al. | July 13, 1943 |
| 2,375,282 | Clemens | May 8, 1945 |
| 2,382,490 | Lawlor | Aug. 14, 1945 |